Feb. 2, 1937.　　　　J. H. TOBIN　　　　2,069,339
CAMERA
Filed Jan. 20, 1936　　　2 Sheets-Sheet 1

Inventor
James H. Tobin

Feb. 2, 1937.  J. H. TOBIN  2,069,339
CAMERA
Filed Jan. 20, 1936   2 Sheets-Sheet 2

Inventor
James H. Tobin
By
Attorney

Patented Feb. 2, 1937

2,069,339

UNITED STATES PATENT OFFICE 2,069,339

CAMERA

James H. Tobin, Fond du Lac, Wis., assignor to Tobin Tool and Die Company, Inc., Fond du Lac, Wis., a corporation of Wisconsin Application January 20, 1936. Serial No. 59,865

2 Claims. (Cl. 88—17)

This invention relates to cameras and refers particularly to motion picture cameras of the type shown in Letters Patent No. 2,019,767 issued to Charles E. Philmore, November 5th, 1935.

In cameras of this type, difficulty has been experienced in guarding the film against light until its actual exposure. It is, therefore, an object of the present invention to provide means for concentrating the light entering the camera through its objective so as to preclude the possibility of light striking the film before actual exposure.

It is also an object of this invention to provide a light concentrator for the purpose stated which will not in anywise alter the design or construction of the camera.

With the above and other objects in view which will appear as the description proceeds, this invention resides in the novel construction, combination and arangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
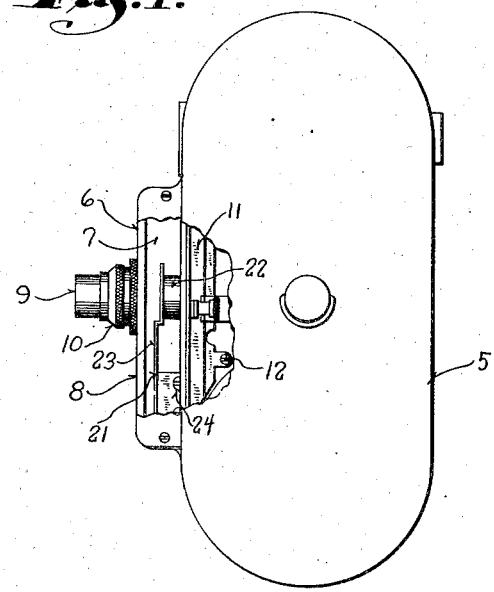
Figure 1 is a side view of a camera embodying this invention with parts thereof broken away to show structural details.
Figure 2:
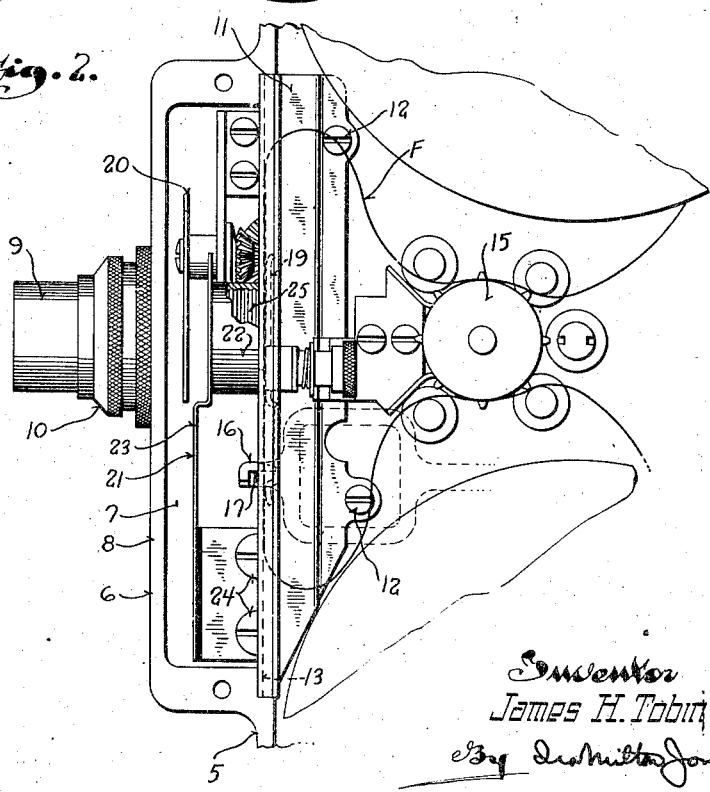
Figure 2 is an enlarged side view of a portion of a camera.
Figure 3:
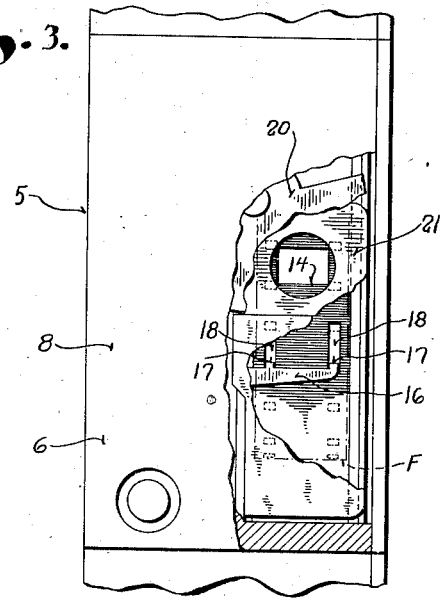
Figure 3 is a front view of part of the camera with a portion thereof broken away and in section.
Figure 4:
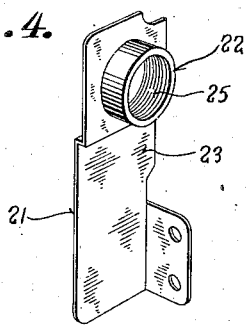
Figure 4 is a perspective view of the light concentrator per se.
Figure 5:
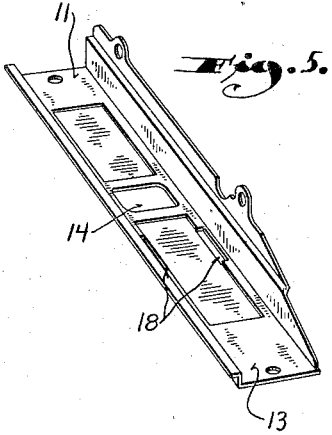
Figure 5 is a perspective view of the film guideway or track.

Referring now more particularly to the accompanying drawings in which like numerals indicate like parts throughout the several views, the numeral 5 designates the housing of a camera constructed in accordance with this invention. The mechanism of the camera contained within the housing 5 forms no part of this invention and for a description thereof reference is made to the aforementioned Patent No. 2,019,767.

At the front of the housing, there is a protrusion 6 providing a shutter compartment 7. The front wall 8 of this compartment carries the objective or lens 9 in a focusing mounting 10.

The back of the shutter compartment is closed by a film guideway or track 11 held in place by screws 12.

This film guideway or track is a stamped sheet metal unit and has a channel 13 to receive and guide the film F past an aperture 14 in the bottom of the channel 13 and in line with the objective 9. The mechanism for advancing the film along the channel 13 includes a sprocket wheel 15 and a claw 16 which reaches into the shutter compartment and has tines 17 projecting rearwardly through slots 18 in the bottom wall of the channel 13 to engage the film. The film is properly held in the channel 13 by a pressure shoe 19.

The usual shutter 20 is rotatably mounted within the compartment 7 to intermittently expose the film as it is advanced through the camera.

It is to be observed that the shutter compartment has substantial area and that while the film guideway or track protects the film from exposure to light entering the compartment through the objective except at the aperture 14 and at the dictation of the shutter 20, nevertheless, it was impossible with past constructions to completely shield the film against premature exposure, and as a consequence the pictures taken did not have the desired degree of clarity. Light leakage was particularly bad through the slots 18 which accommodate the tines of the claw 16.

The present invention overcomes these disadvantages by concentrating the light directly after it enters the shutter compartment through the objective, and for this purpose, a light concentrator, indicated generally by the numeral 21, is provided. This concentrator comprises a tube or sleeve 22 mounted on a bracket 23 fastened in the shutter compartment by screws 24.

The bracket 23 is of such dimensions as to locate the cylinder or sleeve 22 co-axially with the objective with its front end at which it is fastened to the bracket adjacent the shutter 20 and its rear end engaging or directly adjacent the film guideway or track. The light entering the objective is thus concentrated onto the portion of the film in line with the aperture 14 and prevented from striking the film before its actual exposure.

It is also to be noted that the bracket 23 overlies the film guideway or track thus further preventing light from reaching the film.

To break up the light and prevent reflection the interior of the cylinder or sleeve 22 has a plurality of annular serrations 25, and the entire concentrator structure is dull black.

From the foregoing description taken in connection with the accompanying drawings, it will be readily apparent to those skilled in the motion picture art to which this invention appertains, that this invention provides simple and efficient means for use in a camera to prevent the access of light rays to the film prior to the actual exposure thereof.

What I claim as my invention:

1. In a camera, a housing having a bottom wall and side walls and having a protrusion on one of its side walls defining a shutter compartment, said shutter compartment having a solid front wall and end and bottom walls integral therewith to close two sides and the ends of the shutter compartment, a removable rear wall for the shutter compartment forming a partition between it and the interior of the housing, said removable rear wall having an aperture past which film is guided, an objective mounted on the exterior of the front wall in line with said aperture, light concentrating means in the shutter compartment comprising a tube and a bracket to which the tube is secured, said bracket having an attaching flange adapted to be screwed to the side wall of the shutter compartment in a position locating the tube co-axially with the aperture and the objective and with the securing means therefor readily accessible through the open side of the shutter compartment, and a readily removable cover to close said open side of the shutter compartment.

2. In a camera, a housing for the mechanism having a front wall provided with a protrusion forming a shutter compartment, said compartment being substantially oblong in shape and disposed wholly in front of the housing per se and having solid front, end and one side wall with the other side open, a removable cover to close said open side of the compartment, an apertured plate providing a back wall for the compartment and adapted to guide film past the aperture therein, an objective on the exterior of the front wall in line with the aperture, and a light concentrator between the front wall and the apertured plate comprising a tube and a bracket to which the tube is secured, the bracket having an attaching flange to lie flat against the solid side wall of the compartment, and screw means readily accessible through the open side of the compartment for securing said flange to the side wall to mount the light concentrator with its tube in co-axial alignment with the objective and the aperture.

JAMES H. TOBIN.